United States Patent
Khan (10) Patent No.: US 9,846,877 B2
(45) Date of Patent: Dec. 19, 2017

(54) IN-STORE MOBILE PAYMENT

(75) Inventor: Ayub S. Khan, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 615 days.

(21) Appl. No.: 13/485,355

(22) Filed: May 31, 2012

(65) Prior Publication Data

US 2013/0325718 A1    Dec. 5, 2013

(51) Int. Cl.
*G06Q 20/40* (2012.01)
*G06Q 20/20* (2012.01)
*G06Q 20/32* (2012.01)
*G06Q 20/34* (2012.01)
*G06Q 20/36* (2012.01)
*G06Q 20/38* (2012.01)

(52) U.S. Cl.
CPC ......... *G06Q 20/401* (2013.01); *G06Q 20/204* (2013.01); *G06Q 20/325* (2013.01); *G06Q 20/3274* (2013.01); *G06Q 20/3276* (2013.01); *G06Q 20/34* (2013.01); *G06Q 20/36* (2013.01); *G06Q 20/385* (2013.01)

(58) Field of Classification Search
None
See application file for complete search history.

(56) References Cited

U.S. PATENT DOCUMENTS

| | | | |
|---|---|---|---|
| 7,774,283 B2 * | 8/2010 | Das et al. | 705/64 |
| 2004/0128256 A1 * | 7/2004 | Krouse et al. | 705/65 |
| 2005/0109838 A1 * | 5/2005 | Linlor | 235/380 |
| 2010/0057620 A1 * | 3/2010 | Li | G06Q 20/202 705/71 |
| 2012/0173351 A1 * | 7/2012 | Hanson et al. | 705/17 |

OTHER PUBLICATIONS

Asthana, Abhaya et al., "An Indoor Wireless System for Personalized Shopping Assistance," AT&T Bell Laboratories, Murray Hill, New Jersey, USA, 1994.

* cited by examiner

*Primary Examiner* — John Hayes
*Assistant Examiner* — Jason Fenstermacher
(74) *Attorney, Agent, or Firm* — Haynes & Boone, LLP (57) ABSTRACT

An in-store mobile payment system and method can facilitate the use of a user's mobile device to facilitate payment for products purchased at a store. The user can take a picture of a product being purchased or can take a picture of a bar code for the product. The picture can be taken with the user's mobile device and can be used to identify the product. A payment provider can provide a unique PIN code for the transaction. The user can enter the PIN code into a keypad of the merchant and/or can swipe a card with a card reader of the merchant to complete the transaction. Thus, the user can avoid the inconvenience of waiting in line at a checkout counter and the merchant can reduce the store's overhead by eliminating at least some checkout counters and checkout clerks.

20 Claims, 5 Drawing Sheets

IN-STORE MOBILE PAYMENT

BACKGROUND

Technical Field

The present disclosure generally relates to electronic commerce and, more particularly, relates to a method and system for facilitating in-store purchasing using a mobile device.

Related Art

Various methods are commonly used for making in-store purchases. For example, products to be purchased can be brought by the customer to a checkout counter. At the checkout counter, a clerk can scan the products and accept payment. However, such a contemporary checkout can be slow and inconvenient. Often, a customer must wait in a line to reach the checkout counter.

In an attempt to overcome the disadvantages associated with such a contemporary checkout, some stores now provide self-service customer checkout terminals. According to the self-service customer checkout process, a customer scans the purchased items and then uses an automated system to pay for the purchased items. Often, waiting in line can be avoided because there are typically a sufficient number of self-service customer checkout terminals to provide substantially immediate access to customers. More self-service customer checkout terminals than contemporary checkout counters can be used because self-service customer checkout terminals require much less attention by store personnel and are therefore much less labor intensive.

However, many customers are unfamiliar and uncomfortable with self-service customer checkout terminals. Such customers are reluctant to use the self-service customer checkout terminals and therefore use the contemporary checkout counters, thus increasing the length of the line and wait time for the contemporary checkout counters. As such, it is desirable to provide an improved system for facilitating in-store payment.

SUMMARY

According to an embodiment, methods and systems are provided for employing a user's mobile device to facilitate payment for products purchased at a store. The user can take a picture of a product being purchased or can take a picture of a bar code for the product. The picture can be taken with the user's mobile device and the picture can be used to provide a product identification. A payment provider can use the product identification, combined with other information, to provide a unique PIN code for the transaction. The user can enter the PIN code into a keypad of the merchant and/or can swipe a card with a card reader of the merchant to complete the transaction.

According to an embodiment, a system can comprise a payment server having a memory and one or more processors. The memory can store account information for a user in a user account. The account information can include a user identification. The processor(s) can receive a communication from a mobile device of the user including the user identification, a store identification for a store where the user intends to make the purchase, and a product identification for the product which the user intends to purchase. The processor(s) can access the user account and verify, from the account information, that the user is authorized to purchase the product. The processor(s) can send a communication to the user and/or the merchant authorizing the purchase if the user is authorized to purchase the product. The communication can include a PIN code of the transaction.

According to an embodiment, the processor(s) can run a batch process to facilitate payment for the user's purchase to the store. The batch process can facilitate payment for a plurality of users to a plurality of stores. The batch process can be run at the end of a day, week, or month, for example. The batch process can be run, for example, on the payment server. The batch process can be run by a billing service.

According to an embodiment, the processor(s) can send a communication to the mobile device including a request that the user verify a desire to purchase the product, receive a communication from the user verifying that the user desires to purchase the product, and send a communication to the user authorizing the purchase only if the communication from the user verifying that the user desires to purchase the product is received.

According to an embodiment, the product identification can be a picture of the product. According to an embodiment, the product identification can be a picture of a bar code of the product. In either instance, the processor(s) can be operable to identify the product from the picture. The picture can be taken with a mobile device of the user.

According to an embodiment, the processor(s) can verify that a card of the user was swiped at the store, verify that the PIN code of the transaction was entered at the store, and include payment for the product in the batch process only if the card was swiped at the store and/or the PIN code was entered at the store.

DETAILED DESCRIPTION

An in-store mobile payment system and method can facilitate the use of a mobile device to provide payment for products purchased at a store, according to an embodiment. With the mobile device, a user can take a picture of a product being purchased or can take a picture of a bar code for the product. The picture can be used by the mobile device, a merchant device, a payment server, or the like to identify the product. Identifying the product can include determining a stock keeping unit (SKU) for the product.

A payment provider can act as an agent between the store, e.g., the point of sale, and the shopper. The payment provider can provide a unique PIN code for the transaction. The PIN code can be generated from the SKU, an identification of the user (e.g., a user ID), and/or an identification of the store (e.g., a store ID). The user can enter the PIN code into a keypad of the merchant and/or can swipe a card with a card reader of the merchant to complete the transaction. The user does not need to purchase the product via a contemporary checkout counter. Thus, the user can avoid the inconvenience of waiting in line at a checkout counter and the merchant can reduce the store's overhead by eliminating the expense associated with at least some checkout counters and checkout clerks.

Figure 1:
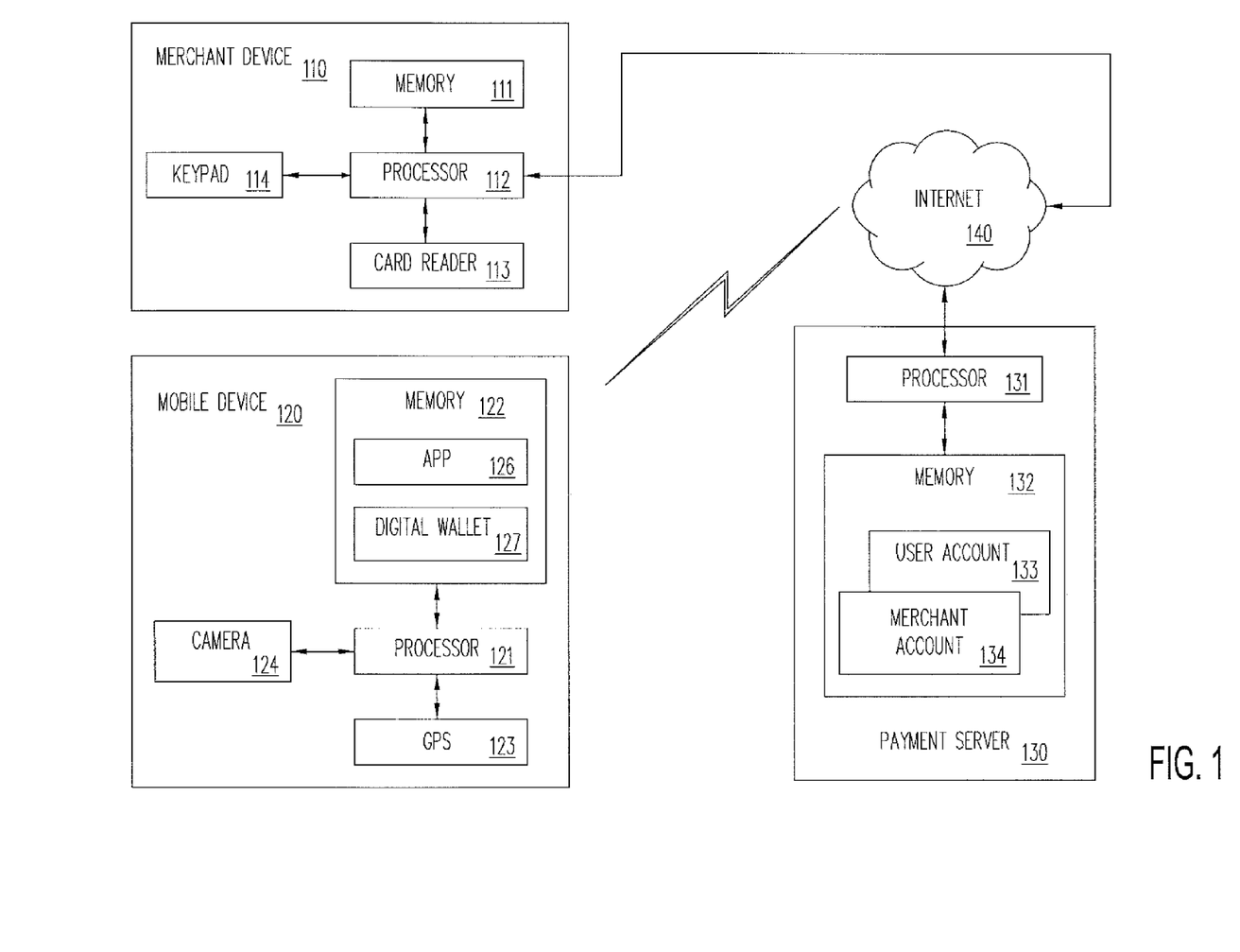
FIG. 1 is a block diagram of a system for in-store mobile payment, according to an embodiment.

FIG. 1 is a block diagram of an in-store mobile payment system, according to an embodiment. The system can include a merchant device 110. The merchant device 110 can be a merchant checkout terminal, a computer, a smart phone, a computing tablet, and/or a server, for example. The merchant device 110 can include a memory 111, a processor 112, a card reader 113, and a keypad 114.

The system can include a mobile device 120. The mobile device 120 can be carried by the user. The mobile device 120 can be a cellular telephone, a smart telephone, a hand held computer, or a tablet computer, for example. The mobile device can include a processor 121, a memory 122, a global positioning system (GPS) 123, and a camera 124.

The memory 122 can store a software or firmware program or application, e.g., an in-store payment app 126, for the in-store mobile payment system and the app 126 can be executable via the processor 121. The memory can store a digital wallet 127 for the user. The digital wallet 127 can store and retrieve information regarding the user's credit, debit, or payment provider account. This information can be used in making the purchase.

The app 126 can have a presentation layer, a communication layer, and the digital wallet 127. The presentation layer can facilitate application presentation. The presentation layer can facilitate image processing, such as to do machine vision and/or barcode scanning/decoding. The communication layer can facilitate communication between the user device 120 and the payment server 130. The communication layer can facilitate communication between the user device 120 and the merchant device 110.

The system can include a payment server 130. The payment server 130 can be a server of a payment provider, such as Paypal, Inc. The payment server 130 can be a single server or can be a plurality of servers. The payment server 130 can include a processor 131 and a memory 132. The memory 132 can store a user account 133 and a merchant account 134.

The memory 132 can store a user account 133 for each user that subscribes to the payment server 130. The user account 133 can contain information such as a user ID, a credit limit, a spending limit, a balance, and a purchase history. The memory 132 can store a merchant account 134 for each merchant that subscribes to the payment server 130. The merchant account can contain information such as a merchant ID and a transaction history.

The processor 131 and the memory 132 can cooperate to provide the in-store mobile system described herein. The merchant device 110, the mobile device 120, and the payment server 130 can communicate with one another via a network, such as the Internet 140. The merchant device 110, the mobile device 120, and the payment server 130 can communicate with one another via a plurality of networks, such as local area networks (LANs), wide area networks (WANs), cellular telephone networks, and the like.

Figure 2:
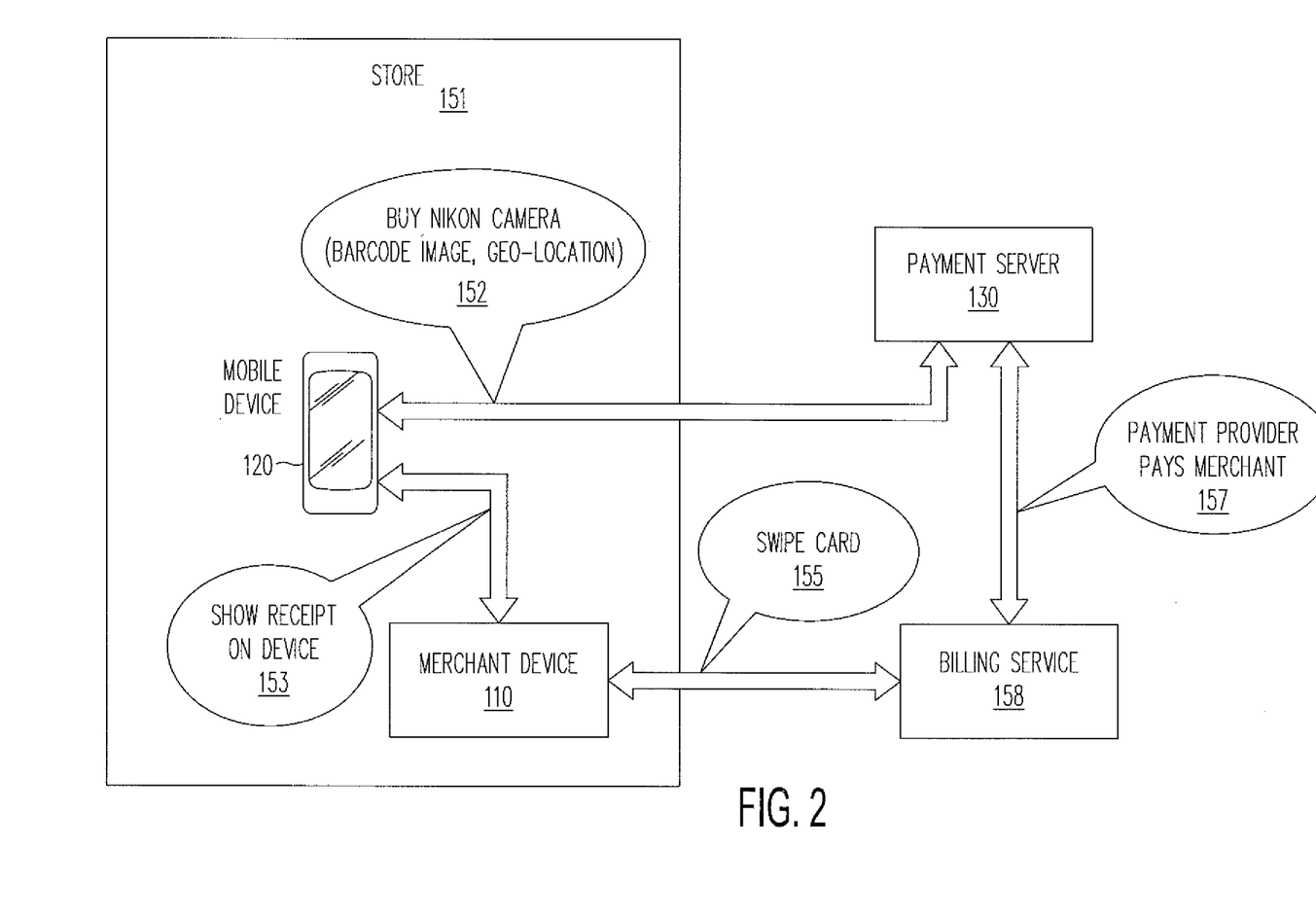
FIG. 2 is a block diagram showing some components and functions for the system for in-store mobile payment, according to an embodiment.

FIG. 2 is a block diagram showing some functions for the system for in-store mobile payment, according to an embodiment. Once a user is in a store 151 and has selected one or more products for purchase, then the user can initiate in-store mobile payment. For example, the user can select an Apple iPad for purchase. The user can initiate in-store payment by starting the app 126 and then imaging the Apple iPad or its bar code, as shown in step 152. If there is a bar code on the Apple iPad, its packaging, or its in-store display, then the bar code can be imaged (either instead of imaging the Apple iPad or in addition thereto). The image can be taken with the camera 124 of the user device 120. Thus, for example, the user can start the in-store payment app 126 on the user's cellular telephone and can image the Apple iPad and/or the barcode for the Apple iPad using the user's cellular telephone.

The image or information representative of the image (such as the camera's stock keeping unit (SKU)) can be communicated from the user device 120 to the payment server 130. Thus, the app 126 can determine an identification of the product. The app 126 of user device 120 can perform image recognition to determine that the image is an image of an Apple iPad. If the app 126 cannot determine the identification of the product or needs further information to do so, then the app 126 can query the user.

For example, the app 126 may be able to determine that the image is of an Apple iPad, but may be unable to determine the model of the Apple iPad. In this instance, the app 126 can query the user by presenting the user with the models of Apple iPad which are sold by the store and asking the user to select the one of these models that is being purchased. By imaging the bar code, such ambiguity and further clarification of the identity of the product being purchased can be avoided.

Image recognition or decoding of the barcode can be done by the app 126 in the user device 120, by the merchant device 110, by the payment server 130, or by any other device at any location. Image recognition or decoding of the barcode can provide an SKU which can be communicated from the user device 120 or the merchant device 110 (from wherever the image recognition or decoding was performed) to the payment server 130. The SKU can be communicated from the user device 120 or the merchant device 130 to the payment server 130 via the Internet 140, for example.

The user device 120 can also communicate information representative of the store ID to the payment server. The store ID can be obtained by the user by imaging a barcode, sign, display or any other indicia representative of the store ID. The store ID can be communicated from the merchant device 110 or from another device of the merchant to the user device 110 via a wireless network, WiFi, or Bluetooth, for example.

The store ID can be obtained by geo-location as shown in step 152. For example, the store ID can be obtained by using the GPS 123 of the user device 120. A GPS location provided by the GPS 123 of the user device can be used by the app 126 or by the payment server 130 to determine the store ID. For example, the app 126 can reference a database of GPS locations and store ID's that are stored in the memory 122 of the mobile device 120. The store ID can be communicated from the user device 120 to the payment server 130 via the Internet 140, for example.

After receiving the communication from the user device 120, the payment server 130 can access the user account 133 and determine if the user is authorized to make the purchase. For example, the payment server 130 can verify that the user has not exceeded a spending or credit limit (taking into account the proposed purchase) and that the store is one for which purchases are authorized. If purchase is authorized, then the payment server 130 can send a communication to the mobile device 120 and/or the merchant device 110. The communication can optionally include the PIN code of the transaction, which can be numbers, letters, symbols, or a combination thereof. The PIN code can optionally provide an added layer of securing and is not necessarily required.

The PIN code can be sent from the payment server 130 to the mobile device 120. The PIN code can be displayed on a screen of the mobile device 120. The PIN code can be read off of the screen and entered, such as by the user, into the merchant device 110 via the keypad 114. The PIN code can be transmitted from either the payment server 130 or the mobile device 120 to the merchant device 110 to avoid having the user manually enter the PIN code into the merchant device 110. According to an embodiment, the PIN code entered by the user must match the PIN code provided by the payment server 130.

The PIN code can be constructed from information regarding the store, the user, and/or the purchased product(s). For example, the PIN can be constructed from or can contain information representative of the store ID, the user ID, and the SKU of all of the products being purchased by the user during this particular transaction. For example, the PIN code can be a hash of information regarding the store, the user, and/or the purchased product(s). In another embodiment, the PIN code can be a randomly generated code associated with the transaction. The PIN code can be generated by the processor 131 of the payment server 130. The PIN code can function to inform the merchant/merchant device 110 that the purchase transaction is authorized. The PIN code can contain or can define an authorization code that informs the merchant/merchant device 110 that the purchase transaction is authorized. Optionally, use of the PIN code can be omitted.

A receipt for the purchase can be printed and given to the user and/or can be communicated from the merchant device 110 to the user device 120, as shown in step 153. For example, an electronic receipt can be communicated to and stored in the digital wallet 127 of the mobile device 120.

Optionally, a credit card or a payment provider card can be swiped via the card reader 113 of the merchant device 110, as indicated in step 155. The payment provider card can be a card of the user or a card of the store. The payment provider card can belong to either the user or the store.

The card can provide further evidence that the transaction is authorized, e.g., not fraudulent. The card can optionally store information regarding the user, the store, the purchase transaction, and/or previous transactions. The payment provider can match information from the card with transaction details to determine if the transaction is authorized. For example, the payment provider can determine if the user name on the card matches the name of the user making the purchase. Alternatively, the card can belong the merchant and can merely provide an identification of the merchant, e.g., a store ID.

The digital wallet 127 can contain an electronic card, e.g., information representative of a credit card, debit card, or payment provider card. Information from the digital wallet 127 can be used instead of or in addition to the credit card. The information can be communicated from the digital wallet 127 to the merchant device 110 via a local area network (LAN, Bluetooth, infrared (IR) communication, or in any other manner. The information can be displayed on a screen of the mobile device 120 and scanned into the merchant device therefrom. For example, the digital wallet 127 can contain an electronic card having an account number, a user name, an expiration date, and any other desired information. The information of the electronic card can be displayed on the screed of the mobile device and can be captured by a camera of the merchant or can otherwise be communicated to the merchant and/or the payment provider.

During a later batch process, the payment server 130 and/or a billing service 208 can facilitate payment for the purchased product(s). For example, the payment server 130 can cooperate with the billing service 158 to transfer money from a payment provider account to an account of the merchant who owns the store 151, as indicated in step 157.

Figure 3:
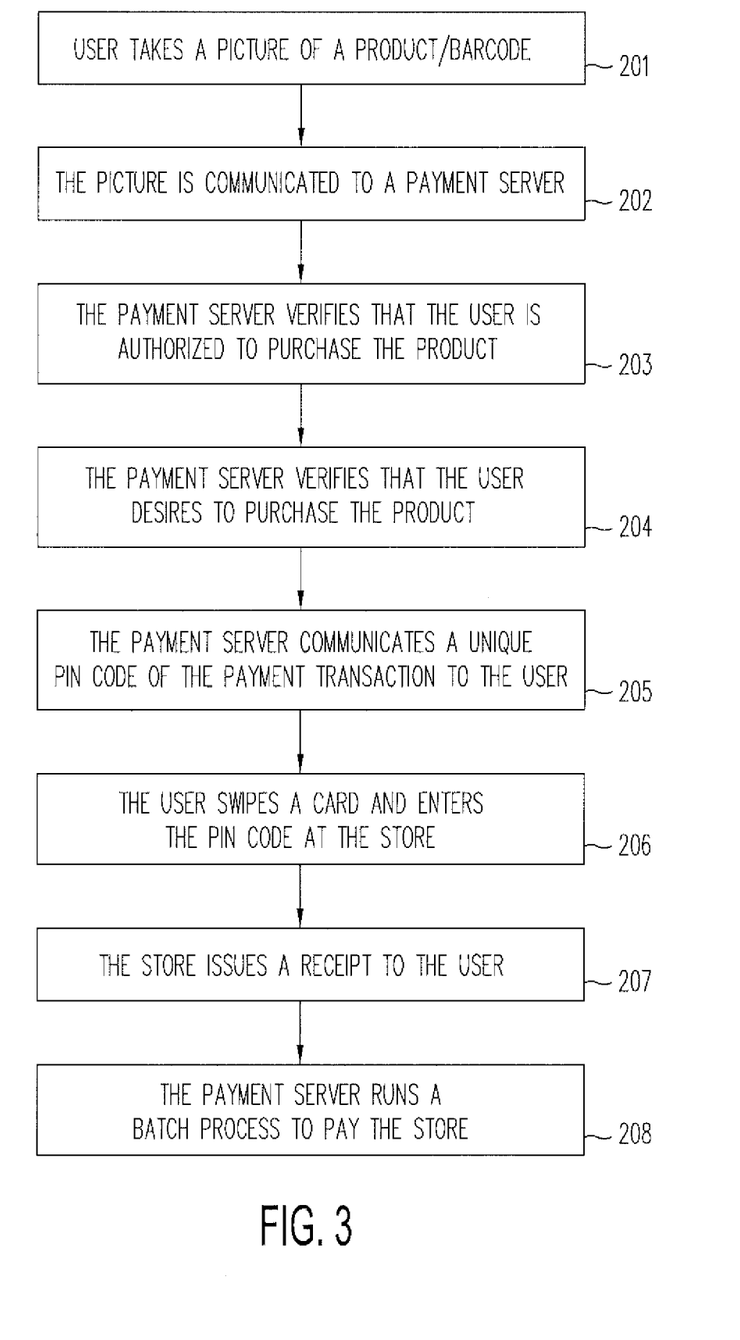
FIG. 3 is a flow chart showing a method for in-store mobile payment, according to an embodiment.

FIG. 3 is a flow chart showing a method for in-store mobile payment, according to an embodiment. The user can take a picture of a product being purchased and/or a bar code of the product being purchase, as shown in step 201. The picture can be used to identify the product. For example, the picture can be used by the mobile device 120, the payment server 130, the merchant device 110, or any other device to determine an SKU or other identification for the product. As discussed herein, products can be recognized and associated with the SKU via the use of machine vision, the bar code, or any other identifying characteristic or mechanism. If the picture is inadequate to identify the product, then the user can enter information into the user device to identify or help identify the product.

For example, the image can be communicated to the payment server 130, as shown in step 202. A processor 131 of the payment server can run a machine vision recognition algorithm on the image if the image is an image of the product being purchased. If the image is an image of the barcode of the product being purchased, then the payment server 130 can run a barcode decoding program on the barcode.

The user can be prompted by the app 126 to pay for the product(s) being purchased. For example, after the products have all been properly identified by the in-store mobile payment system, then the user can be asked to begin the payment process. The user can begin the payment process by selecting "Yes" to a question displayed on the mobile device 120 such as "Pay for purchases now?"

The payment server 130 can verify that the user is authorized to purchase the product, as shown in step 203. The payment server 130 can check the user account 133 to obtain information that is indicative of the user's authorization to purchase the product. For example, the user account 113 can contain an account record that indicates whether or not the user is in good standing with the payment provided, the user's credit limit, whether or not the merchant subscribes to the payment provider, and the like. The payment server 130 can use such information to determine whether or not the user is to be authorized to make the purchase.

The payment server 130 can verify that the user desires to purchase the product, as shown in step 204. This can be done by the payment server 130 communicating a query to the user. The query can ask the user to verify the user's desire to make the purchase and can include a total price for the purchase.

The payment server 130 can communicate a unique PIN code of the payment transaction to the user, as shown in step 205. This can be the PIN code discussed above. Thus, the PIN code can be used by the merchant to verify that the payment service will pay the merchant for the product.

The user can swipe a credit card or payment provider card and enter the PIN code at the store 201, as indicated in step 206. The card can be swiped via card reader 113. The PIN code can be entered via the keypad 114. Payment for the purchased can be authorized by the payment server 130 in response to receipt of the picture, upon entry of the PIN, upon swiping of the card, or when any combination of these steps has been completed.

The store 151 can issue a receipt to the user, as shown in step 207. The receipt can be a paper receipt or an electronic receipt, as discussed herein.

The payment server can run a batch process to pay the store, as shown in step 208. Both the user and the store can subscribe to the same payment provider. The user and the store can subscribe to different payment providers.

Figure 4:
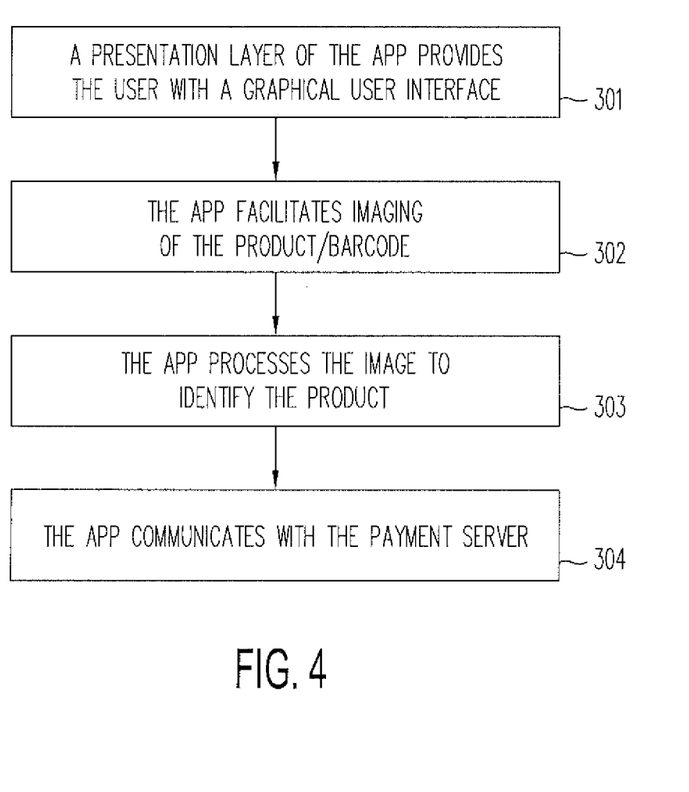
FIG. 4 is a flow chart showing operation of an app for the method for in-store mobile payment, according to an embodiment.

FIG. 4 is a flow chart showing operation of the app 126 of the method for in-store mobile payment, according to an embodiment. A presentation layer of the app 126 can provide the user with a graphical user interface, as shown in step 301. Alternatively, the user can be presented with a text interface. From the user interface, the user can make a selection to take a picture of the product or barcode. Two different options can be presented to the user. For example, the user can select either "Take a picture of the product" or "Take a Picture of the Barcode", such as from a drop down menu. The app 126 can facilitate imaging of the product or barcode, as shown in step 302.

The app 126 can process the image to identify the product, as discussed in step 303. Alternatively, the payment server 130, merchant device 110, or any other device can process the image to identify the product.

The app 126 can communicate with the payment server 130, as indicated in step 304. For example, the app 126 can communicate the image of the product or barcode to the server 130 for processing thereof.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Figure 5:
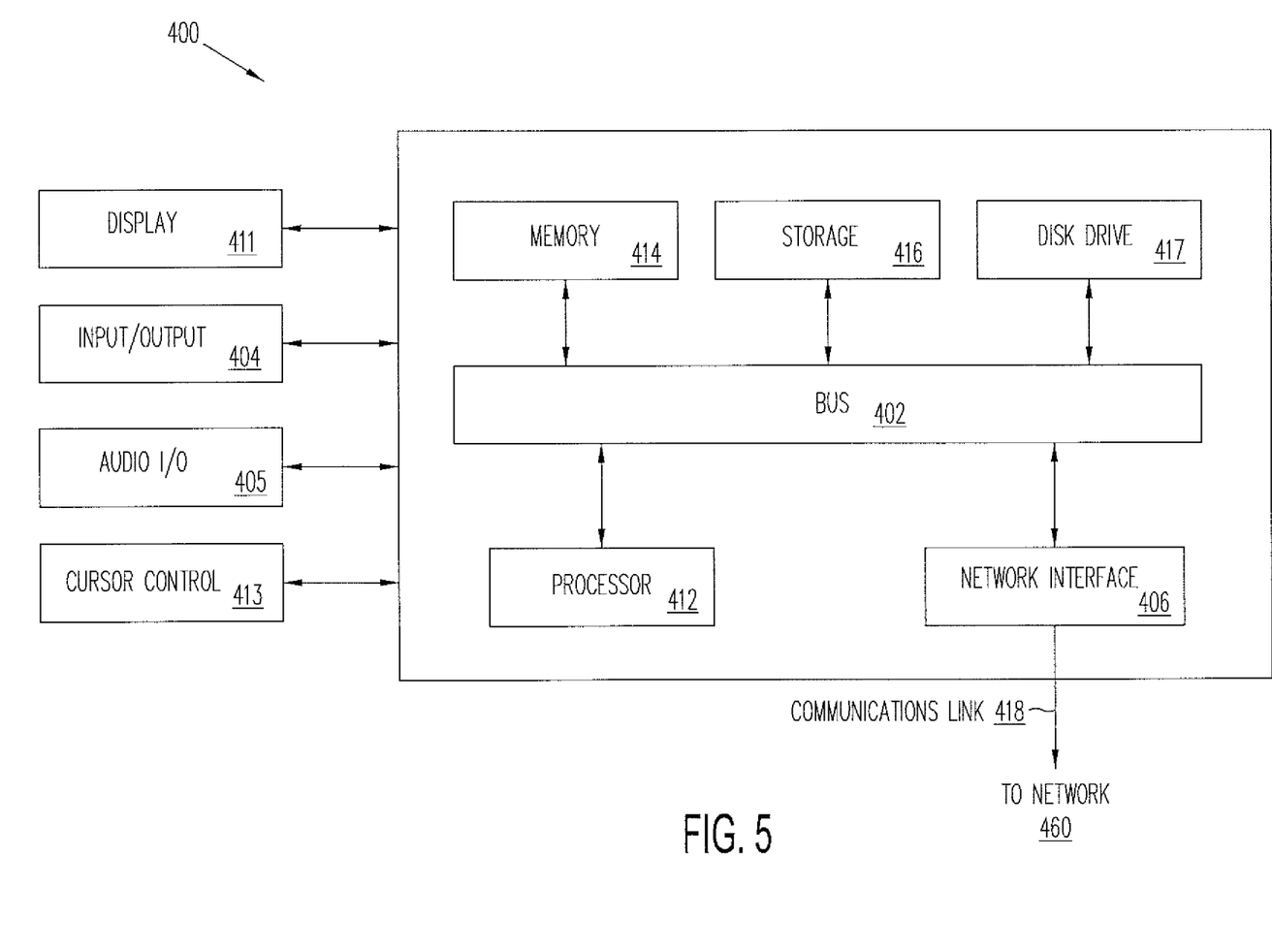
FIG. 5 is a block diagram of an example of a computer that is suitable for use in the system for in-store mobile payment, according to an embodiment.

FIG. 5 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "store" can include any business or place of business. The store can be a brick and mortar store or an online store. The store can be any person or entity that sells a product.

As used herein, the term "product" can include any item or service. A product can be anything that can be sold.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

The in-store mobile payment system and method can facilitate the use of a user's mobile device to facilitate payment for products purchased at a store. As discussed above, the user can take a picture of a product being purchase or can take a picture of a bar code for the product. The picture can be taken with the user's mobile device and can be used to identify the product. A payment provider can provide a unique PIN code for the transaction. The user can enter the PIN code into a keypad of the merchant and/or can swipe a card with a card reader of the merchant to complete the transaction. Thus, the user can avoid the inconvenience of waiting in line at a checkout counter and the merchant can reduce the store's overhead by eliminating at least some checkout counters and checkout clerks.

The foregoing disclosure is not intended to limit the present invention to the precise fours or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving, from a mobile device over a network, a purchase transaction request comprising geo-location data determined by a global positioning system (GPS) of the mobile device, image data corresponding to one or more products captured by a camera of the mobile device, and a user identification corresponding to a user of the mobile device;
   in response to receiving the geo-location data, determining an identifier of a store corresponding to the received geo-location data;
   determining one or more product identifiers for the one or more products based on the received image data;
   accessing a funding account of the user to verify that the user is authorized to purchase the one or more products using the funding account;
   constructing a unique code as a function of the user identification, the identifier of the store, and the one or more product identifiers, the unique code uniquely representing the user, the store, and the one or more products associated with the purchase transaction request;
   authorizing the purchase transaction request by associating the unique code with the purchase transaction request and sending the unique code to the mobile device over the network;
   receiving, from a checkout terminal over the network, a communication comprising a user input code and data related to a pending purchase including data identifying a consumer, a location of the checkout terminal, and a set of products to be purchased by the consumer;
   determining that the pending purchase is valid by verifying that the user input code corresponds to both the unique code transmitted to the mobile device and the data related to the pending purchase; and
   in response to receiving the user input code and determining that the pending purchase is valid, transferring an amount corresponding to the purchase transaction request from the funding account of the user to a funding account of a merchant corresponding to the store.

2. The system of claim 1, wherein the operations further comprise running a batch process to facilitate payments for multiple authorized purchase transaction requests.

3. The system of claim 1, wherein the operations further comprise:
   sending a request to verify the purchase transaction request to the mobile device; and
   receiving a verification from the mobile device;
   wherein sending the unique code is in response to receiving the verification from the mobile device.

4. The system of claim 1, wherein verifying that the user is authorized to purchase the one or more products using the funding account comprises comparing a balance of the funding account against a purchase amount associated with the purchase transaction request.

5. The system of claim 1, wherein the image data comprises at least one of an image of the one or more products or an image of one or more barcodes associated with the one or more products.

6. The system of claim 5, wherein determining the product identifier for the one or more products comprises deriving the product identifier from the image.

7. A method comprising:
receiving, by one or more processors over a network from a mobile device, a purchase transaction request comprising geo-location data determined by a global positioning system (GPS) of the mobile device, image data corresponding to one or more products captured by a camera of the mobile device, and a user identification corresponding to a user of the mobile device;
in response to receiving the geo-location data, determining, by the one or more processors, an identifier of a store corresponding to the received geo-location data;
determining, by the one or more processors, one or more product identifiers for the one or more products based on the received image data;
accessing, by the one or more processors, a funding account of the user to verify that the user is authorized to purchase the one or more products using the funding account;
constructing, by the one or more processors, a unique code as a function of the user identification, the identifier of the store, and the one or more product identifiers, the unique code uniquely representing the user, the store, and the one or more products associated with the purchase transaction request;
authorizing the purchase transaction request by associating, by the one or more processors, the unique code with the purchase transaction request and sending, by the one or more processors over the network, the unique code to the mobile device;
receiving, by the one or more processors from a checkout terminal over the network, a communication comprising a user input code and data related to a pending purchase including data identifying a consumer, a location of the checkout terminal, and a set of products to be purchased by the consumer;
determining, by the one or more processors, that the pending purchase is valid by verifying that the user input code corresponds to both the unique code transmitted to the mobile device and the data related to the pending purchase; and
in response to receiving the user input code and determining that the pending purchase is valid, transferring, by the one or more processors, an amount corresponding to the purchase transaction request from the funding account of the user to a funding account of a merchant corresponding to the store.

8. The method of claim 7, further comprising running, by the one or more processors, a batch process to facilitate payments for multiple authorized purchase transaction requests.

9. The method of claim 7, further comprising:
sending, by the one or more processors, a request to verify the purchase transaction request to the mobile device; and
receiving, by the one or more processors, a verification from the mobile device;
wherein sending the unique code to the mobile device is in response to receiving the verification from the mobile device.

10. The method of claim 7, wherein the image data comprises one or more images of the one or more products.

11. The method of claim 7, wherein the image data comprises one or more images of one or more barcodes associated with the one or more products.

12. The method of claim 11, wherein determining the product identifier for the one or more products comprises deriving the product identifier based on the one or more barcodes.

13. The method of claim 7, wherein verifying that the user is authorized to purchase the one or more products using the funding account comprises comparing a balance of the funding account against a purchase amount associated with the purchase transaction request.

14. A non-transitory machine-readable medium having stored thereon machine-readable instructions executable to cause a machine to perform operations comprising:
receiving, from a mobile device over a network, a purchase transaction request comprising geo-location data determined by a global positioning system (GPS) of a mobile device, image data corresponding to one or more products captured by a camera of the mobile device, and a user identification corresponding to a user of the mobile device;
in response to receiving the geo-location data, determining an identifier of a store corresponding to the received geo-location data;
determining one or more product identifiers for the one or more products based on the received image data;
accessing a funding account of the user to verify that the user is authorized to purchase the one or more products using the funding account;
constructing a unique code as a function of the user identification, the identifier of the store, and the one or more product identifiers, the unique code uniquely representing the user, the store, and the one or more products associated with the purchase transaction request;
authorizing the purchase transaction request by associating the unique code with the purchase transaction request and sending the unique code to the mobile device over the network;
receiving, from a checkout terminal over the network, a communication comprising a user input code and data related to a pending purchase including data identifying a consumer, a location of the checkout terminal, and a set of products to be purchased by the consumer;
determining that the pending purchase is valid by verifying that the user input code corresponds to both the unique code transmitted to the mobile device and the data related to the pending purchase; and
in response to receiving the user input code and determining that the pending purchase is valid, transferring an amount corresponding to the purchase transaction request from the funding account of the user to a funding account of a merchant corresponding to the store.

15. The non-transitory machine-readable medium of claim 14, wherein the operations further comprise running a batch process to facilitate payments for multiple purchase transaction requests.

16. The non-transitory machine-readable medium of claim 14, wherein the operations further comprise:

sending a request to verify the purchase transaction request to the mobile device; and receiving a verification from the mobile device;

wherein sending the unique code to the mobile device is in response to receiving the verification from the mobile device.

17. The non-transitory machine-readable medium of claim 14, wherein the image data comprises one or more images of the one or more products.

18. The non-transitory machine-readable medium of claim 14, wherein the image data comprises one or more images of one or more barcodes associated with the one or more products.

19. The non-transitory machine-readable medium of claim 18, wherein the determining of the product identifier for the one or more products comprises deriving the product identifier based on the one or more barcodes.

20. The non-transitory machine-readable medium of claim 14, wherein verifying that the user is authorized to purchase the one or more products using the funding account comprises comparing a balance of the funding account against a purchase amount associated with the purchase transaction request.

* * * * *